Sept. 21, 1965 K. W. VAN DUZER, JR 3,207,928

PULSE WIDTH DISCRIMINATION CIRCUIT

Filed Oct. 23, 1962

INVENTOR.
KENNETH W. VAN DUZER, JR.

BY [signature]

ATTORNEY.

United States Patent Office 3,207,928 Patented Sept. 21, 1965

3,207,928

PULSE WIDTH DISCRIMINATION CIRCUIT

Kenneth W. Van Duzer, Jr., Severna Park, Md., assignor, by mesne assignments, to the United States of America as represented by the Secretary of the Navy Filed Oct. 23, 1962, Ser. No. 232,630
10 Claims. (Cl. 307—88.5)

The invention relates to a new and improved pulse discrimination circuit, and more particularly to a transistor control pulse discrimination circuit which produces an output pulse upon the occurrence of a series of pulses which satisfy certain predetermined time and polarity requirements.

In the field of pulse discriminating circuits, it has been the general practice to employ a delay means to temporarily store a pulse for comparison with a subsequent incoming pulse. Although such purposes have served the purpose, they have not proved entirely satisfactory under all conditions for the reason that considerable difficulty has been experienced in satisfying the requirements for rejecting unwanted signals while at the same time making proper selection of the signals presented to the system based both upon time and polarity.

One purpose of the present invention is to provide a completely transistorized pulse width discrimination circuit which is not affected by spurious signals while at the same time making a proper determination based upon both polarity and time by employing simple reliable components in the circuitry which cooperate together to produce the desired result with a minimum of components.

An object of the present invention is to provide a transistorized circuit to indicate an electrical pulse output each time a preselected input sequence of input electrical pulse events separated by a predetermined time occurs.

Another object of the present invention is to provide a stable transistorized circuit in which a pulse of proper polarity will initiate a timer so that after a predetermined time of pulse of complementary polarity will produce an electrical pulse output when the desired sequence of pulses has occurred.

Other objects and features of the invention will become apparent to those skilled in the art upon consideration of the following detailed description of an embodiment of the invention as illustrated in the accompanying sheet of drawing in which.

Figure 1:
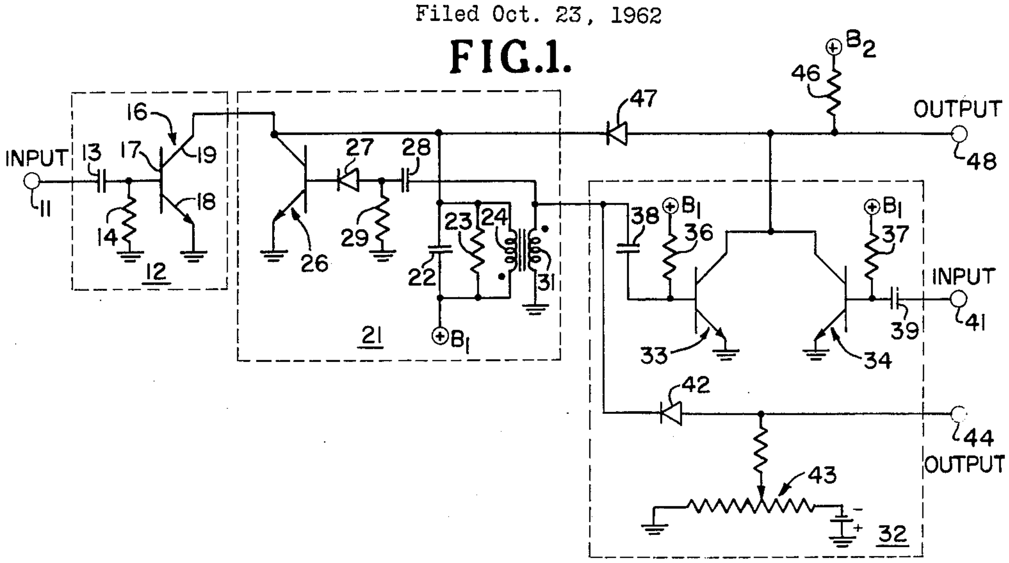
FIG. 1 is a schematic dagram of the present invention.

Referring now to the drawing, FIG. 1 is a schematic diagram in which a first input terminal 11 receives the signals from a prior filter and differentiation network (not shown). The signals presented to the filter and differentiation network are signals which generally vary between a reference point or ground potential and either a positive voltage or a negative voltage and the signal condition lasts for a predetermined time. Thus, when the signals are passed through the differentiation and filter network the resulting wave appears as a half cycle wave pulse which alternately varies between one polarity and the other or complementary polarity.

The transistorized gate shown generally at 12 is connected to a first input terminal 11. Within the transistorized gate 12 is a blocking capacitor 13 connected to the first input terminal 11 to block unwanted D.C. signals. The other side of the blocking capacitor 13 is connected to the base 17 of the NPN transistor shown generally at 16. Also connected to the base 17 of the NPN transistor 16 is a biasing resistor 14, the other end of which is connected to ground and thereby under normal conditions the transistor is nonconducting due to the fact that the emitter 18 of the transistor 16 is also connected to ground. The collector 19 of the transistor 16 is connected to a positive potential $B_1$ within the blocking oscillator shown generally at 21. The occurrence of a positive differentiated pulse appearing at the first input terminal 11 will pass blocking capacitor 13 thereby raising the bias potential on the base 17 of the transistor 16 to allow conduction of the transistor and substantially connect the collector 19 to the ground potential of emitter 18.

Within the blocking oscillator 21 there is a tuned RLC network having a capacitor 22, a resistor 23 and a primary winding 24 of an iron core transformer connected in parallel to each other. One terminal of the network is connected to a source of positive potential $B_1$ while the other terminal of the parallel network is connected to the collector of NPN transistor 26, which is further connected to the collector of the NPN transistor 16 in the gate 12. The emitter of the transistor 26 is connected to ground while the base of transistor 26 is connected to the cathode of the diode 27, while the anode of diode 27 is connected to one terminal of the blocking capacitor 28 and one terminal of a bias resistor 29. The other terminal of the bias resistor 29 is connected to ground and the other terminal of the blocking capacitor 28 is connected to one terminal of the secondary winding 31 of an iron core transformer while the other terminal of the secondary winding 31 is connected to ground. When the gate 12 becomes conductive due to a positive input pulse as described before, current begins to flow from the source of positive potential at one side of the tuned RLC parallel network through the conducting transistor 16 within the gate 12. This conduction makes the primary winding 24 of the iron core transformer which has the dot, positive with respect to the other terminal and induces a voltage in secondary winding of the iron core transformer 31, which is also positive where the dot is shown. As the induced voltage in the secondary winding 31 builds up, it becomes more positive, the voltage is passed by the blocking capacitor 28 and after reaching a certain predetermined bias determined by the diode 27 of the diode becomes conductive thus making the base of transistor 26 positive with respect to its emitter thereby substantially connecting the collector of transistor 26 to ground through the emitter. After the current has built up and reached a steady state condition the flux connecting the primary winding 24 with the secondary winding 31 becomes constant causing a resulting drop in voltage in the secondary winding 31 which tends to cut transistor 26 off thereby causing a reversal in the flux in the primary winding which causes further reduction in the conduction of transistor 26 and thereby causes a negative swing of the voltage to appear at the secondary winding 31. The secondary winding 31 of the transformer acts as a feedback through the control transistor 26 and a positive input voltage to input terminal 11 causes one cycle of oscillation to appear at the secondary winding 31 of the transformer in which the first swing of the oscillation is in a positive polarity succeeded by a swing in the negative direction with a subsequent return to the normal potential at ground.

The output of the blocking oscillator 21 is taken off of the secondary winding 31 and is connected to a coincident circuit 32 which can also be called a polarity responsive AND circuit. Coincident circuit 32 has two further NPN transistors 33 and 34 whose emitters are connected to ground and whose bases are connected to a source of positive potential $B_1$ through bias resistors 36 and 37 respectively. The collectors of the NPN transistors 33 and 34 are connected together and are connected to a second source of positive potential $B_2$ as will be described in greater detail later. The output of the blocking transformer taken off the secondary winding 31 is connected to one terminal of a blocking capacitor 38, the other terminal of the blocking capacitor being connected to the junction of the base of transistor 33 and the bias resistor 36. The base of the other transistor 34 is connected to one terminal of blocking capacitor 39 as well as one terminal of the bias resistor 37. The other terminal of the blocking capacitor 39 is connected to a second input terminal 41. Connected to the blocking capacitor 38 on the side of the blocking oscillator 21 is a cathode of a diode 42. The anode of this diode is connected to a source of variable negative potential 43 so that the diode 42 is normally in a nonconductive state since the anode is held at a negative potential with respect to the cathode. Off of the diode 42 a negative pulse is obtainable at the negative output 44 whenever the diode 42 becomes conductive by overcoming the negative bias, as will be described later. The operation of the coincident circuit 32 will be described in a subsequent paragraph.

The collectors of the transistors 33 and 34 are connected to a source of potential $B_2$ through a current limiting resistor 46. This source of potential is positive and of a much larger potential, approximately four and half times, than the positive potential utilized in the remaining portions of the circuit. Connected between the collectors of the transistors 33 and 34 and the current limiting resistor 46 is the anode of a diode 47, the cathode being connected to the collector transistor 26 and to one side of the parallel RLC tuned circuit. The purpose of this diode 47 is as a feedback network utilized when coincidence occurs as will be described later. Also connected between the collector transistors 33 and 34 and one terminal of the current limiting resistor 46 is a positive output terminal 48.

The operation of the coincidence circuit 32 will now be described. The transistors 33 and 34 are normally conducting due to the presence of a positive bias potential on the bases through the bias resistors 36 and 37 keeping or maintaining the collectors of transistors 33 and 34 at or near ground potential thereby preventing the conduction of the feedback diode 47 since the anode of the diode is negative with respect to the cathode. There are three sets of conditions which can affect the coincidence circuit 32, the one being a negative output from the blocking oscillator sufficient to overcome the positive bias on the base of the transistor 33 to interrupt conduction of the normally conducting transistor 33, a second condition is the input of a negative pulse on a second input terminal 41 which is sufficient to overcome the normally positive bias on the base of transistor 34 and cut conduction of the transistor 34 off by driving its base negative with respect to its emitter, and the third condition is when a negative pulse occurs simultaneously from the output of the blocking capacitor 38 and also the negative pulse on the second input terminal 41 thereby cutting off conduction of both transistors 33 and 34. The first condition, the cutting off of the transistor 33 due to the negative swing of the output of the blocking oscillator 21 will occur any time the blocking oscillator is initiated by a positive pulse to the input 11 which produces a cycle operation in the blocking oscillator, and in the cycle of operation in which the cycle goes negative the transistor 33 is cut off. The nonconducting of the transistor 33 does not substantially affect the circuit since the transistor 34 is still in a normally conducting state. In the similar manner the presence of a negative pulse on the second input terminal 41 without the simultaneous occurrence of a negative output in the blocking oscillator 21 causes the conduction of the transistor 34 to be cut off while the conduction of transistor 33 remains highly conductive and thereby does not alter the condition that the collectors of the transistors 33 and 34 are nearly at ground potential. Upon the simultaneous occurrence of a negative pulse from the blocking oscillator 21 being applied to the base of transistor 33 and cutting off the conduction at transistor 33 as well as a negative input on the second input terminal 41 thereby cutting off the conduction of the transistor 34 the potential present on the collectors of transistors 33 and 34 rises rapidly and since the source of potential to these collectors is approximately four and one-half times the positive potential of the other biases in the circuit the diode 47 becomes conductive since the anode will then be positive with respect to the cathode and a feedback current breaks down the diode and connects the one side of the RLC tuning circuit network, which is normally negative to a source of high potential, so that the normally positive terminal is then negative with respect to the other terminal. This sudden imposition of a high potential produces a further negative swing on the secondary winding of the transformer secondary winding 31 of the iron core transformer due to the increase of flux caused by the increase in current in the primary winding 24. This causes a further negative swing in the negative cycle of operation appearing from the blocking oscillator 21 and overcomes the normally negative bias on the diode 42 thus making the normally nonconductive diode 42 conductive and producing a negative output pulse on the output terminal 44. In a similar manner a positive output pulse is produced on the positive output terminal 48 by the simultaneous changing of the transistors 33 and 34 from the normally conducting state to the nonconducting state thereby substantially raising the positive potential on the collectors of the transistors 33 and 34.

In summary therefore of the operation of the transistorized pulse with the termination circuit of FIG. 1 a negative input to the first input terminal 11 does not cause initiation of the cycle of oscillation since the gate transistor 16 will not be conductive, however, a positive pulse on the first input terminal 11 causes the gate transistor 16 to be conductive thereby initiating a cycle of oscillation in the blocking oscillator 21 which has a first period of time in which the polarity of the oscillation is positive and a second period of time in which the polarity of oscillation is on the negative swing. The output of this blocking transformer is then fed to the coincidence circuit 32 which will produce an output if the second input terminal 41 receives a negative pulse during the second period of time for the oscillation which produces an output on both output terminals 44 and 48. The first and second input terminals 11 and 41 respectively can either be connected together so that they both receive the same series of input pulses since the first input terminal 11 is responsive to positive pulses only and the second input terminal 41 is responsive to negative input pulses only, or the two terminals may be connected to separate and distinct sources of input pulses and thereby correlate the two separate pulses by applying the same criteria as in the first instances.

The circuit of FIG. 1 has been described as an illustrative example of a suitable circuitry which will operate satisfactorily in the present invention, however, it is within the ability of one skilled in the art to alter the operation of the circuitry by changing the NPN transistors illustrated to PNP transistors by changing the bias potentials the circuit will operate in a manner opposite of that of the present invention so that the conditions of the pulses may be the opposite of what they are in the first illustrative example.

Figure 2A:
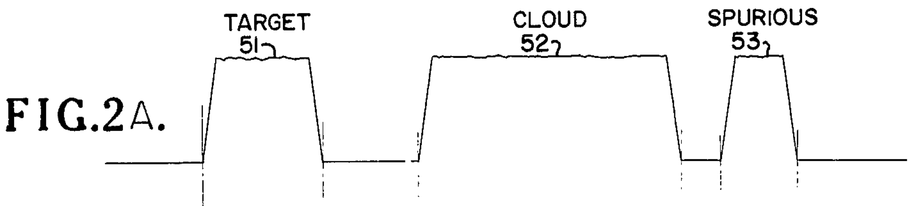
FIGS. 2A through 2C are graphs showing various waveforms appearing throughout the circuit.
Figure 2B:
Figure 2C:
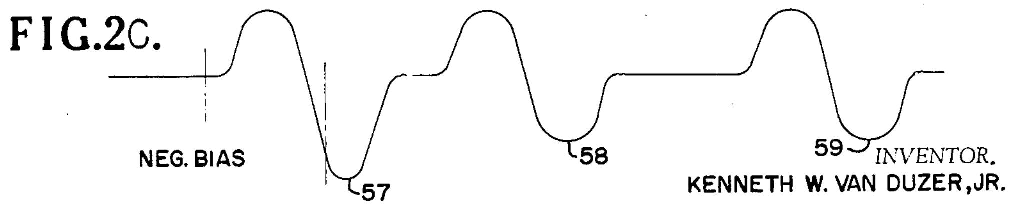

FIGS. 2A through 2C are graphs of various waveforms which appear throughout the system. As an illustrative example of the utilization of the device of the present invention is in an infrared scanning system or a radar scanning system. The graph of FIG. 2 shows examples of three possible signals which can be obtained. In a scanning system, whenever the scanner comes in scanning contact with an object the voltage output increases. In FIG. 2A the first such voltage increase 51 which is designated a target indicates a pulse of acceptable time duration while the second pulse 52 designated a cloud would indicate a detection by the scanning system in which the time duration of the pulse is in excess of that acceptable to the present pulse width discrimination circuit and a third pulse 53 labeled spurious would be an example of a pulse in which the time duration is insufficient or too short to result in a recognition by this pulse with the discrimination circuit. The pulses illustrated in FIG. 2A can be obtained from any suitable scanning means (not shown). FIG. 2B illustrates typical differentiated pulses as would be presented to bases of transistor 16 of the gate 12 and the base of transistor 34 in a coincident circuit 32. These pulses represent a differentiated signal of the leading and trailing edges of the pulses represented by FIG. 2A. Upon presentation of every pulse of FIG. 2B of the positive polarity 54, the transistor 16, FIG. 1, becomes conductive and initiates a cycle of operation as described before and each negative pulse 56 of FIG. 2B stops conduction of transistor 34 in the coincident circuit 32, FIG. 1, as has been described before.

In FIG. 2C, it will be noted that the first cycle of oscillation 57 in negative swing of the oscillation is greater than that present in either the second 58 or third 59 cycle of oscillation.

FIG. 2C illustrates the output of the secondary winding of the transformer 31, FIG. 1 in which the signal has the proper polarity and is also of proper time duration. On the base of the transistor 33, FIG. 1, the pulses in FIG. 2C will also appear and during the negative half cycle or the second period time as has been described before, transistor 33 is cut off, and upon the occurrence of a negative pulse 56 shown in FIG. 2B, transistor 34, FIG. 1, will be turned off due to the negative bias of the pulse negative pulse appearing at the base of the transistor 34. Upon the nonconduction of both transistors 33 and 34 by coincidence of pulses 56 and negative cycle of oscillation 57, diode 47, the feedback diode becomes conductive and a high potential applied to the one side of the RLC network causes the further driving of the negative portion of oscillation as shown by 57 of FIG. 2C to produce a negative swing of oscillation of greater amplitude than the negative bias of source 43, FIG. 1, and thus making the diode 42 conductive by driving the cathode of diode 42 negative with respect to the anode and thus producing a negative output at the terminal 44. Also, with the simultaneous nonconduction of transistors 33 and 34 and the subsequent rise in voltage of the collectors of transistors 33 and 34 a positive output is obtained at the positive output terminal 48. It should be noted here that in the absence of the feedback circuit, including the diode 47, an output pulse will be obtained by the coincident nonconduction of transistors 33 and 34 upon the positive output terminal 48 due to the rapid rise of the potential on the collectors of transistors 33 and 34. As will be noted, the negative half of the cycle of oscillation of FIG. 2C, in the case of the cloud and spurious signal 58 and 59, respectively, does not occur at a time simultaneous with the negative pulse 56 shown in FIG. 2B and therefore either one or the other of the transistors 33 and 34 is conductive at all times and thus prevents an output pulse from appearing on the output pulse terminal 48 as well as preventing a negative output from the negative output terminal 44 since the negative portion of the swing of oscillation is not of sufficient amplitude to overcome the bias of the diode 42.

By the proper controlling on the bias resistor 36 to the base of the transistor 33 the period of acceptability of a negative pulse could be increased or decreased by preventing the conduction of the transistor 33 to the various portions of the negative half of the cycle. Likewise, the period of oscillation can control the second period of time in which a suitable output pulse is obtainable by changing the RLC components within the paralleled tuned oscillator. Also, by the changing of the transistors from NPN to PNP, various combinations of positive and negative signals on the input pulse terminals can result in various combinations of an output pulse upon proper polarity being applied thereto. Likewise, the interchanging of the transistors together with the reversing of the direction of the windings of the primary and secondary windings can result in another circuit which will operate by a different combination of polarities. The circuit of FIG. 1 has been described as an illustrative example of a typical circuit embodying the principles of the present inyention and produces a simple and reliable means for obtaining an output pulse upon proper correlation of the input pulses.

It should be understood, of course, that the foregoing disclosure relates to only an illustrative example of the invention and that numerous deviations or alterations may be made therein without departing from the spirit and the scope of the invention as set forth in the appended claims.

What is claimed is:

1. A circuit for producing an output pulse only upon the occurrence of predetermined time spaced input pulses of complementary polarity comprising a blocking oscillator means for producing upon intiation a single output cycle of oscillation having a first period of time and a second period of time defined by the polarity of the oscillation, gating means passing a first source of input pulses of one polarity connected to said blocking oscillator means for initiating the output cycle of oscillation, and coincidence means connected to said blocking oscillator means for receiving the output cycle of oscillation and having an input for receiving a second source of input pulses and producing an output pulse only upon occurrence of an input pulse of a second source of the other polarity during the second period of time.

2. A circuit as recited in claim 1 wherein feedback means are connected from the coincident means to the blocking oscillator means.

3. A circuit as recited in claim 2 wherein the first source of input pulses and the second source of input pulses are connected together to form a single source of pulses.

4. A circuit for producing an output pulse only upon occurrence of a pair of predetermined time spaced input pulses of complementary polarity comprising an input terminal, a gate means connected to said input terminal and responsive to an input pulse of one polarity, blocking oscillator means connected to said gate means and being energized by said gate means upon the occurrence of a pulse of the one polarity, polarity coincidence means connected to said blocking oscillator means and to said input terminal producing an output signal only upon the coincidence of the input pulse being of the other polarity and the output of said blocking oscillator being of the other polarity.

5. A circuit as recited in claim 4 wherein a positive feedback means is connected from the signal output of said polarity coincidence means to said blocking oscillator means.

6. A circuit for producing a pair of series pulses of complementary polarity occurring in a predetermined time relationship to each other comprising two input terminals for receiving series pulses, a gate connected to one of said input terminals for passing the series pulses of one polarity, a blocking oscillator connected to said one gate being energized for a cycle of oscillation by the passed pulse of one polarity and a cycle of oscillation being equal to the predetermined time relationship between the series pulses complementary polarity, a comparator having a pair of inputs, one of said pair of inputs connected to the output of the blocking oscillator, the other of said pair of inputs being the other of said two input terminals, said comparator producing an output pulse upon the coincidence of the same polarity of the pair of input pulses to said comparator whereby an output pulse from said comparator indicates an occurrence of a pair of series pulses of complementary polarity occurring in a predetermined time relationship to each other.

7. A circuit as recited in claim 6 wherein a feedback circuit is connected from the output of the comparator to the oscillator.

8. A circuit for producing an output pulse upon an occurrence of predetermined time spaced input pulses of complementary polarity comprising an input terminal, a blocking oscillator means for producing upon initiation output cycle oscillation having a first period of time and a second period of time defined by the polarity of the oscillation, gating means connected between said input terminal and said blocking oscillator means for initiating the output cycle of oscillation upon the occurrence of an input pulse of one polarity to said input terminal, coincidence means connected to both said blocking oscillator means for receiving the output cycle of oscillation and to said input terminal for receiving all input pulses and producing an output pulse only upon occurrence of input pulses of the other polarity during the second period of time.

9. A circuit as recited in claim 8 wherein a feedback means is connected from said coincidence means to said blocking means.

10. A circuit for producing an output pulse upon the occurrence of predetermined time spaced input pulses of complementary polarity comprising a first input means; a blocking oscillator means having a first NPN transistor for controlling the oscillation of said blocking oscillator, a capacitor, a resistor and a primary winding of a transformer connected in parallel and forming a tuned circuit connected between a first source of positive potential and a collector of the first NPN transistor, a diode, a secondary winding of the transformer connected between the ground potential and the anode of the diode, the cathode of the diode being connected to the base of the first NPN transistor to form a positive feedback and bias circuit, an emitter of the first NPN transistor being connected to ground potential; gating means having a second NPN transistor with the base connected to said first input means, an emitter connected to ground potential, and a collector connected to the collector of the first NPN transistor; polarity coincidence means having a third and a fourth NPN transistor with the collectors of the third and fourth NPN transistor being connected together to a second source of positive potential, the emitters of the third and fourth NPN transistors being connected together to ground potential, the base of the third NPN transistor being connected to the junction between the anode of the diode and the secondary winding of the transformer, the base of the fourth NPN transistor being connected to a second input means; feedback means having a diode with a cathode connected to the collector of the first NPN transistor and an anode connected to the collectors of the third and fourth NPN transistors; an output means having a positive output connected to the collectors of the third and fourth NPN transistors and a negative output connected to the base of the third NPN transistor.

References Cited by the Examiner

UNITED STATES PATENTS

| | | | |
|---|---|---|---|
| 2,795,696 | 6/75 | Evans | 331—149 |
| 3,089,089 | 5/63 | Rhodes | 328—40 |

ARTHUR GAUSS, *Primary Examiner.*